US006614020B2

(12) United States Patent
Cornish

(10) Patent No.: US 6,614,020 B2
(45) Date of Patent: Sep. 2, 2003

(54) GRIDLESS, FOCUSING ION EXTRACTION DEVICE FOR A TIME-OF-FLIGHT MASS SPECTROMETER

(75) Inventor: Timothy J. Cornish, Catonsville, MD (US)

(73) Assignee: The Johns Hopkins University, Baltimore, MD (US)

(*) Notice: Subject to any disclaimer, the term of this patent is extended or adjusted under 35 U.S.C. 154(b) by 0 days.

(21) Appl. No.: 10/220,865

(22) PCT Filed: May 10, 2001

(86) PCT No.: PCT/US01/15096

§ 371 (c)(1), (2), (4) Date: Sep. 6, 2002

(87) PCT Pub. No.: WO01/88951

PCT Pub. Date: Nov. 22, 2001

(65) Prior Publication Data

US 2003/0038234 A1 Feb. 27, 2003

Related U.S. Application Data

(60) Provisional application No. 60/203,595, filed on May 12, 2000.

(51) Int. Cl.[7] .......................... B01D 55/44; H01D 49/00

(52) U.S. Cl. ....................... 250/287; 250/282; 250/283; 250/396 R; 250/397; 250/287

(58) Field of Search ................................ 250/282, 283, 250/287, 288, 396 R, 397

(56) References Cited

U.S. PATENT DOCUMENTS

| | | | | | |
|---|---|---|---|---|---|
| 2,624,535 | A | * | 6/1953 | Bollhoefer | 250/287 |
| 2,642,535 | A | | 6/1953 | Schroeder | 250/41.9 |
| 4,731,538 | A | * | 3/1988 | Gray | 250/397 |
| 5,065,018 | A | * | 11/1991 | Bechtold et al. | 250/287 |
| 5,510,613 | A | * | 4/1996 | Reilly et al. | 250/287 |
| 5,614,711 | A | * | 3/1997 | Li et al. | 250/287 |
| 5,834,771 | A | * | 11/1998 | Yoon et al. | 250/286 |
| 5,861,623 | A | * | 1/1999 | Park | 250/287 |
| 5,994,695 | A | * | 11/1999 | Young | 250/287 |
| 6,369,383 | B1 | * | 4/2002 | Cornish et al. | 250/286 |
| 2002/0060289 | A1 | * | 5/2002 | Cornish et al. | 250/281 |

FOREIGN PATENT DOCUMENTS

| | | | | |
|---|---|---|---|---|
| JP | 2001-176444 | * | 6/2001 | H01J/49/40 |
| JP | 2001176444 | | 6/2001 | 49/40 |
| WO | WO 0188951 | * | 11/2001 | 250/287 |
| WO | WO 01093306 | * | 12/2001 | 250/287 |

* cited by examiner

*Primary Examiner*—John R. Lee
*Assistant Examiner*—James P. Hughes
(74) *Attorney, Agent, or Firm*—Francis A. Cooch

(57) ABSTRACT

A miniature time-of-flight mass spectrometer (TOF-MS) is provided having (1) a gridless, focusing ionization extraction device allowing for the use of very high extraction energies in a maintenance-free design, (2) a miniature flexible circuit-board reflector using rolled flexible circuit-board material, and (3) a low-noise, center-hole microchannel plate detector assembly that significantly reduces the noise (or "ringing") inherent in the coaxial design. A method is also provided for increasing the collection efficiency of laser-desorbed ions in the TOF-MS. The method includes the steps of providing within the TOF-MS an ionization extraction device having an unobstructed central chamber having a first region and a second region; creating an ion acceleration/extraction field within the first region; accelerating ions within the first region; de-accelerating the ions in the second region; and drifting the ions in a drift region to cause ion dispersion.

20 Claims, 6 Drawing Sheets

GRIDLESS, FOCUSING ION EXTRACTION DEVICE FOR A TIME-OF-FLIGHT MASS SPECTROMETER

CROSS-REFERENCE TO RELATED APPLICATIONS

This application claims the benefit of prior filed co-pending U.S. Provisional Patent Application No. 60/203,595, filed May 12, 2000.

BACKGROUND OF THE INVENTION

1. Field of the Invention

The present invention relates to a miniature time-of-flight mass spectrometer (TOF-MS). The inventive spectrometer includes (1) a gridless, focusing ionization extraction device allowing for the use of very high extraction energies in a maintenance-free design, and (2) a low-noise, center-hole microchannel plate detector assembly that significantly reduces the noise (or "ringing") inherent in the coaxial design.

2. Description of the Related Art

Miniature time-of-flight mass spectrometers (TOF-MS) have the potential to be used in numerous field-portable and remote sampling applications due to their inherent simplicity and potential for ruggedization. Conventional wisdom, however, holds that a compact TOF-MS would not have sufficient drift length to achieve high performance, as measured by good resolving power or the capability to detect and identify product ions.

These capabilities, found only in laboratory grade instruments, would greatly enhance the utility of a field portable TOF-MS. Without the benefit of an extended drift region (and thereby long flight times), good resolution can only be achieved in a compact TOF-MS if the ion peaks are quite narrow. All aspects of the miniature analyzer and ionization processes that affect ion peak widths must therefore be optimized for minimum peak broadening to improve the overall performance of the field portable TOF-MS.

Commercially available short-pulse lasers and fast transient digitizers enable the creation and measurement of very narrow ion signals, but the ion source region, reflector performance, and detector response will each contribute to the final peak width as well. To this end, components need to be developed for the miniature TOF-MS that improve its overall performance.

Accordingly, a need exists to develop components for the miniature TOF-MS that improve its overall performance and are compatible with short-pulse lasers and fast transient digitizers. More specifically, a need exists for a focusing ionization extraction device and a low-noise channel-plate detector assembly which improve the overall performance of the miniature TOF-MS.

SUMMARY OF THE INVENTION

The present invention provides a miniature time-of-flight mass spectrometer (TOF-MS) having (1) a gridless, focusing ionization extraction device allowing for the use of very high extraction energies in a maintenance-free design, (2) a miniature flexible circuit-board reflector using rolled flexible circuit-board material, and (3) a low-noise, center-hole microchannel plate detector assembly that significantly reduces the noise (or "ringing") inherent in the coaxial design. The components described herein improve the overall performance of the TOF-MS. These components have been developed with special attention paid to ruggedness and durability for operation of the TOF-MS under remote and harsh environmental conditions.

The present invention also provides a method for increasing the collection efficiency of laser-desorbed ions in the TOF-MS. The method includes the steps of A method for increasing the collection efficiency of laser-desorbed ions in a TOF-MS, said method comprising the steps of providing an ionization extraction device within the TOF-MS, where the ionization extraction device has an unobstructed central chamber having a first region and a second region; creating an ion acceleration/extraction field within the first region; accelerating ions within the first region; de-accelerating the ions in the second region; and drifting the ions in a drift region to cause ion dispersion.

DESCRIPTION OF THE PREFERRED EMBODIMENTS

A discussion is first made as to the inventive components of a miniature time-of-flight mass spectrometer (TOF-MS) of the present invention. The inventive components include (1) the gridless, focusing ionization extraction device, (2) the flexible, circuit-board reflector, and (3) the center-hole microchannel plate detector assembly. Following this discussion, a description is provided of an experimental TOF-MS which was constructed and used to evaluate the performance of the inventive components.

I. Instrumentation

A. Gridless, Focusing Ionization Extraction Device

Figures 1A, 1B:
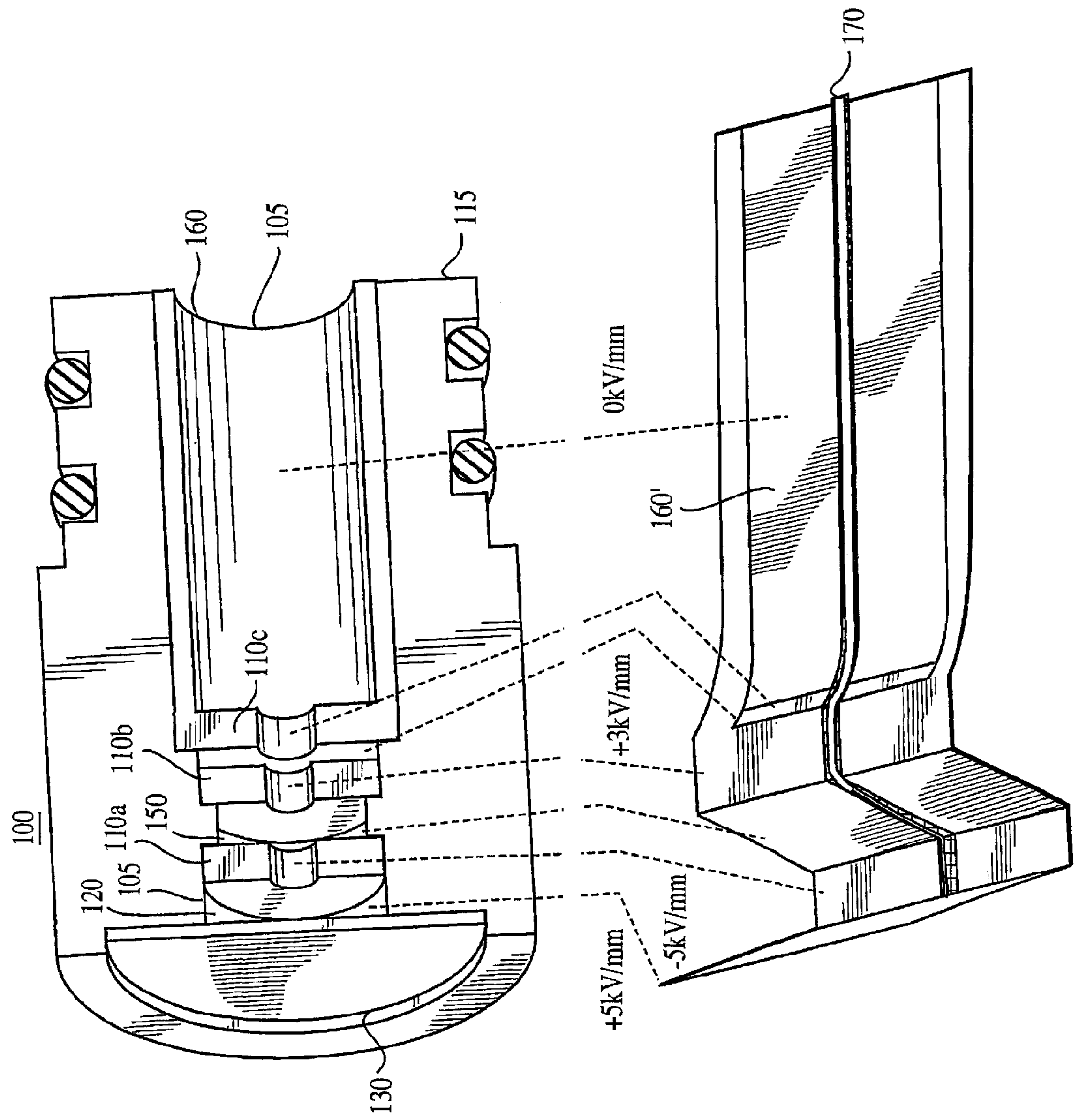
FIG. 1A is a cross-sectional view of a gridless, focusing ionization extraction device for a TOF-MS according to the present invention.
FIG. 1B is a potential energy plot of the electric field generated by the gridless, focusing ionization extraction device.

To increase the collection efficiency of laser-desorbed ions from a surface, a gridless focusing ionization extraction device of the present invention will now be described. The ionization extraction device is shown by FIG. 1A and designated generally by reference numeral 100. The device 100 has a preferred length of approximately 17–25 mm and includes a series of closely spaced micro-cylinders 110_a–c_ mounted within an unobstructed central chamber 105 which is defined by the housing 115. The housing is constructed from one or more insulating materials, such as ceramics, Teflon, and plastics, preferably, PEEK plastic.

The micro-cylinders 110*a–c* are constructed from metallic materials, such as stainless steel and may have varying thickness ranges. Further, it is contemplated that each micro-cylinder is constructed from a different metal and that each micro-cylinder has a different thickness. The micro-cylinders 110 create an extremely high ion acceleration/extraction field (up to 10 kV/mm) in region 120, as shown by the potential energy plot depicted by FIG. 1B, between a flat sample probe 130 and an extraction micro-cylinder 110*a*.

Ions are created in region 120 by laser ablation or matrix assisted laser desorption/ionization (MALDI). The ions are then accelerated by the ion acceleration/extraction field in region 120.

The ions are slowed in a retarding field region 150 between the extraction micro-cylinder 110*a* and the middle micro-cylinder 110*b*. The retarding field region 150 serves both to collimate the ion beam, as well as to reduce the ion velocity. The ions are then directed through the middle micro-cylinder 110*b*, where the ions are accelerated again (up to 3 kV/mm as shown by FIG. 1B).

After traversing through the micro-cylinders 110*a–c*, the ions enter a drift region 160 within the chamber 105 where the potential energy is approximately 0 kV/mm as shown by the potential energy plot depicted by FIG. 1B and referenced by numeral 160'. Reference number 170 in FIG. 1B references the ion trajectories through the device 100.

The series of micro-cylinders 110*a–c* minimizes losses caused by radial dispersion of ions generated during the desorption process. Although the ionization extraction device 100 of the present invention employs a very high extraction field 120, the ions are slowed prior to entering the drift region 160, thus resulting in longer drift times (or flight duration) and hence increased ion dispersion of the ions within the drift region 160.

Furthermore, the performance of the ionization extraction device 100 is achieved without the use of any obstructing elements in the path of the ions, such as grids, especially before the extraction micro-cylinder 110*a*, as in the prior art, thus eliminating transmission losses, signal losses due to field inhomogeneities caused by the grid wires, as well as the need for periodic grid maintenance.

B. Flexible, Circuit-Board Reflector

Ion reflectors, since their development 30 years ago, have become a standard part in many TOF-MSs. While there have been improvements in reflector performance by modifications to the voltage gradients, the mechanical fabrication is still based on stacked rings in most laboratory instruments. In such a design, metallic rings are stacked along ceramic rods with insulating spacers separating each ring from the next. While this has been proven to be satisfactory for the construction of large reflectors, new applications of remote TOF mass analyzers require miniaturized components, highly ruggedized construction, lightweight materials, and the potential for mass production.

Figure 2A:
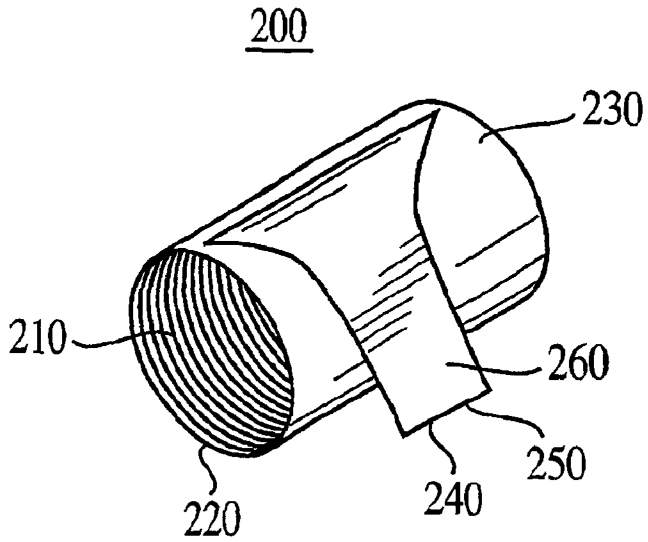
FIG. 2A is a perspective view of a flexible circuit-board reflector in a rolled form according to the present invention.
Figure 2B:
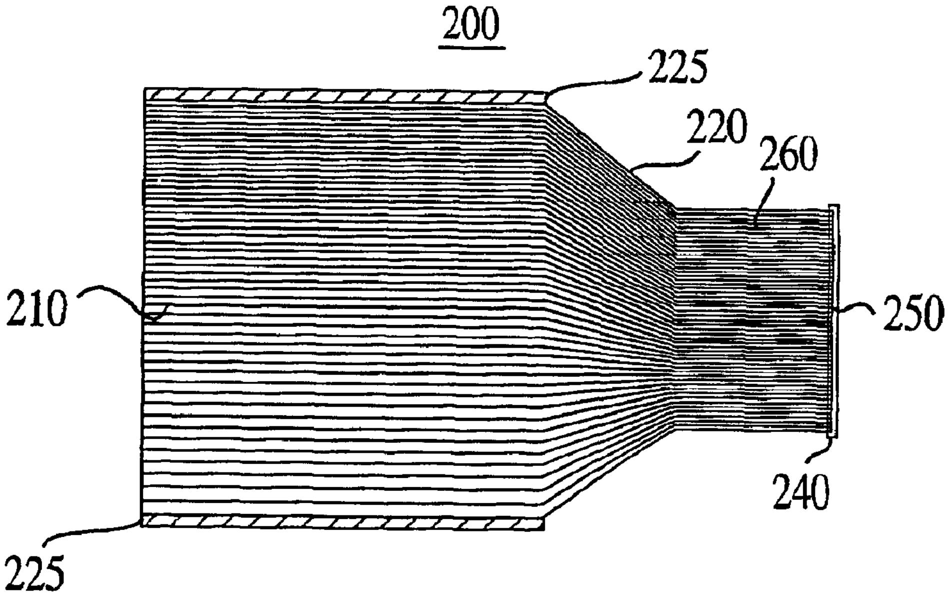
FIG. 2B is top view of the flexible circuit-board reflector in an unrolled form.

To this end, the ion reflector of the present invention shown by FIGS. 2A and 2B and designated generally by reference numeral 200 was developed utilizing the precision of printed circuit-board technology and the physical versatility of thin, flexible substrates. A series of thin copper traces (0.203 mm wide by 0.025 mm thick) 210 are etched onto a flat, flexible circuit-board substrate 220 having tabs 225 protruding from two opposite ends (FIG. 2B). The circuit-board substrate 220 is then rolled into a tube 230 (FIG. 2A) to form the reflector body, with the copper traces 210 facing inward, forming the isolated rings that define the voltage gradient.

The thickness and spacing of the copper traces 210 can be modified by simply changing the conductor pattern on the substrate sheet 220 during the etching process. This feature is particularly useful for the production of precisely tuned non-linear voltage gradients, which are essential to parabolic or curved-field reflectors. The trace pattern on the circuit-board substrate 220 shown in FIGS. 2A and 2B represents a precision gradient in the spacing of the traces 210. Thus, in the resultant reflector, a curved potential gradient is generated by employing resistors of equal value for the voltage divider network.

For data reported in this study (see section II), the reflector was constructed from a circuit-board with equally-spaced copper traces 210 used in conjunction with a series of potentiometers to establish a curved potential gradient.

Once etched, the circuit-board substrate 220 is rolled around a mandrel (not shown) to form a tubular shape as shown in FIG. 2A. Five layers of fiberglass sheets, each approximately 0.25 mm thick, are then wrapped around the circuit-board substrate 220. The length of the curving edge of the board 220 is approximately equal to the circumference of the mandrel. When the sheets are wrapped around the rolled circuit-board, a slight opening remains through which a connector end 240 of the inner circuit-board can extend. The position of each successive sheet is offset slightly with respect to the previous sheet so that a gradual “ramp” is formed, thereby guiding the flexible circuit-board substrate 220 away from the mandrel.

The reflector assembly is heated under pressure at 150° C. for approximately two hours, followed by removal of the mandrel. Wall thickness of the finished rolled reflector assembly is approximately 1.5 mm. A multi-pin (preferably, 50-pin) ribbon-cable connector 250 is soldered onto a protruding circuit-board tab 260 so that a voltage divider resistor network can be attached to the reflector. Alternately, soldering pads for surface-mount resistors can be designed into the circuit-board layout, allowing the incorporation of the voltage divider network directly onto the reflector assembly.

Finally, polycarbonate end cap plugs (not shown) are fitted into the ends of the rolled reflector tube 230 to support the assembly as well as provide a surface for affixing terminal grids. Vacuum tests indicate that the circuit-board and fiberglass assembly is compatible of achieving vacuum levels in the low $10^{-7}$ torr range.

The reflector 200 is disclosed in a U.S. Provisional Patent Application Serial No. 60/149,103 filed on Aug. 16, 1999 by a common assignee as the present application.

C. Center-Hole Microchannel Plate Detector Assembly

For miniature TOF mass spectrometers, the center hole (coaxial) geometry is a highly desirable configuration because it enables the simplification of the overall design and allows for the most compact analyzer. However, the poor signal output characteristics of conventional center hole microchannel plate detector assemblies, particularly the problem with signal “ringing”, clutter the baseline and, as a consequence, adversely affects the dynamic range of the instrument. This limitation severely reduces the chance of realizing high performance in miniature TOF instruments, since low intensity fragment or product ion peaks can be obscured by baseline noise. Improvements to the analog signal quality of center-hole channel-plate detectors would therefore increase the ultimate performance of the mass spectrometer, particularly the dynamic range.

Commercially available coaxial channel-plate detectors rely upon a disk-shaped center-hole anode to collect the pulse of electrons generated by the microchannel plates. The anode is normally matched to the diameter of the channel-plates, thereby, in theory, maximizing the electron collection efficiency. However, the center-hole anode creates an extraneous capacitance within the grounded mounting enclosure. The center-hole anode also produces a significant impedance mismatch when connected to a 50 Ω signal cable. The resultant ringing degrades and complicates the time-of-flight spectrum by adding a high frequency component to the baseline signal. Moreover, the disk-shaped anode acts as an antenna for collecting stray high frequencies from the surrounding environment, such as those generated by turbomolecular pump controllers.

Figure 3A:
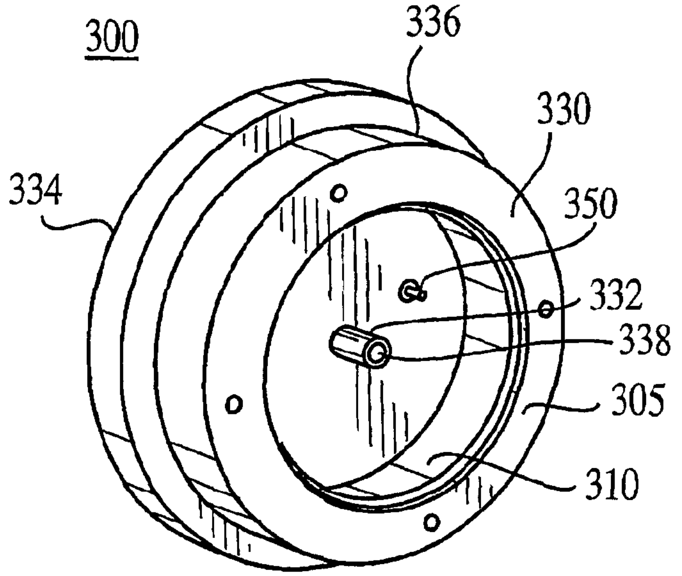
FIG. 3A is a perspective view of a center-hole microchannel plate detector assembly according to the present invention.
Figure 3B:
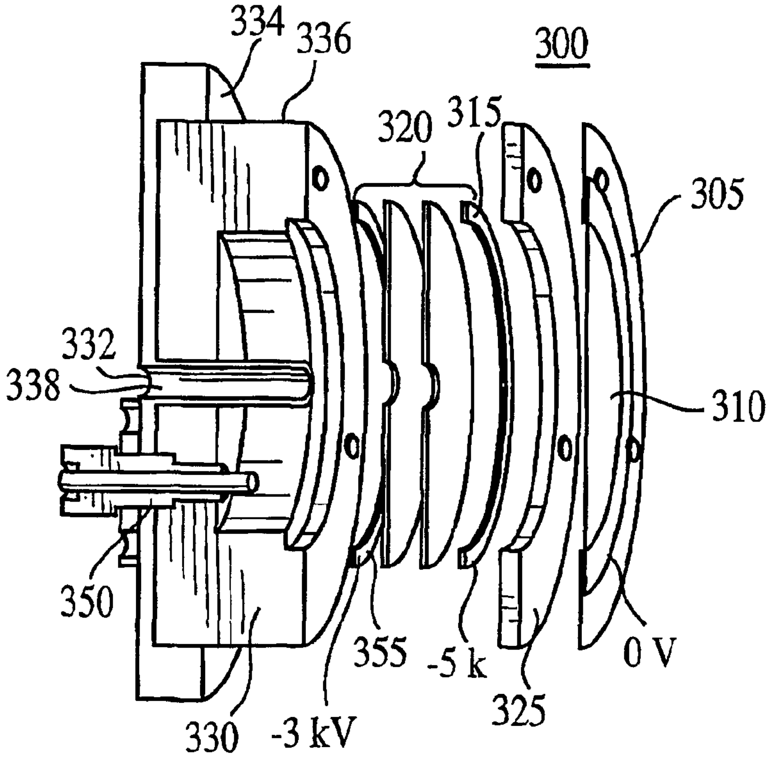
FIG. 3B is a cross-sectional, exploded view of the center-hole microchannel plate detector assembly showing the internal components.

The pin anode design of the center-hole microchannel plate detector assembly of the present invention as shown by FIGS. 3A and 3B and designated generally by reference numeral 300 has been found to substantially improve the overall performance of the detector assembly 300. For enhanced sensitivity, the assembly 300 includes a clamping ring 305 having an entrance grid 310 which is held at ground potential while a front surface 315 of a center-hole microchannel plate assembly 320 (FIG. 3B) is set to −5 kV, post-accelerating ions to 5 keV. The clamping ring 305 is bolted to an inner ring 325. The inner ring 325 is bolted to a spherical drum 330 having a tube 332 extending from a center thereof and a shield 334 encircling an outer surface 336. The tube 332 defines a channel 338. The shield is fabricated from any type of conducting material, such as aluminum, and stainless steel foil.

Using voltage divider resistors, the rear of the plate assembly 320 is held at −3 kV as shown by FIG. 3B. Since the collection pin anode 350 is isolated from the center of the detector assembly 300, i.e., isolated from the channel 338 defined by the tube 332, its potential is defined by the oscilloscope's front end amplifier (nominally ground). Thus, electrons emitted from a rear microchannel plate 355 of the plate assembly 320 will be accelerated toward the grounded anode 350 regardless of the anode's size, geometry, or location. The pin anode 350 is located about 5 mm behind the rear microchannel plate 355.

It has been demonstrated that the pin anode 350 significantly improves the overall performance of the detector assembly 300. The inventive center-hole microchannel plate detector assembly 300 virtually eliminates the impedance mismatch between the 50 ohm signal cable and the electron collection surface, i.e., the pin anode 350.

Figure 4A:
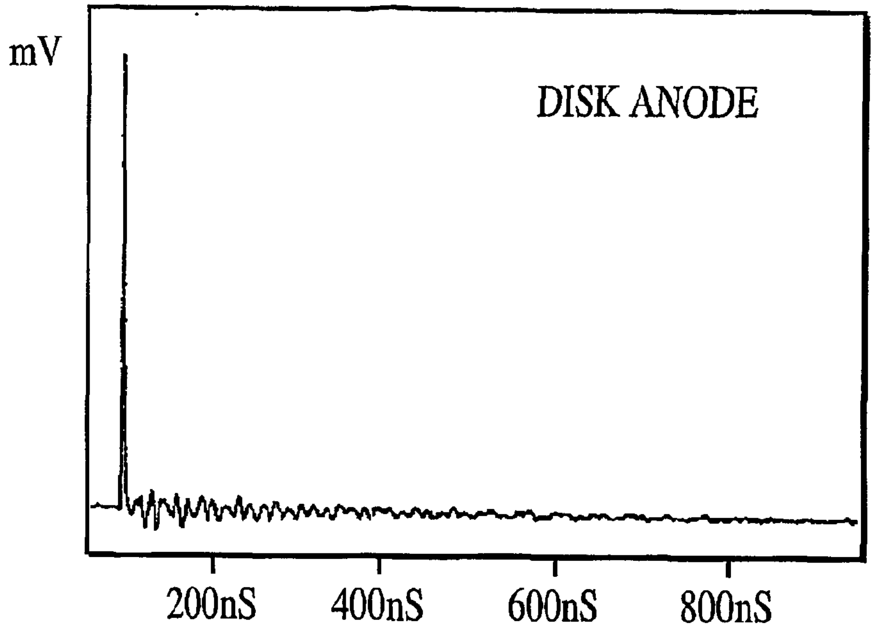
FIG. 4 illustrates the detector response waveform for both the single ion signal from a conventional disk anode detector assembly and the center-hole microchannel plate detector assembly having a pin anode.
Figure 4B:
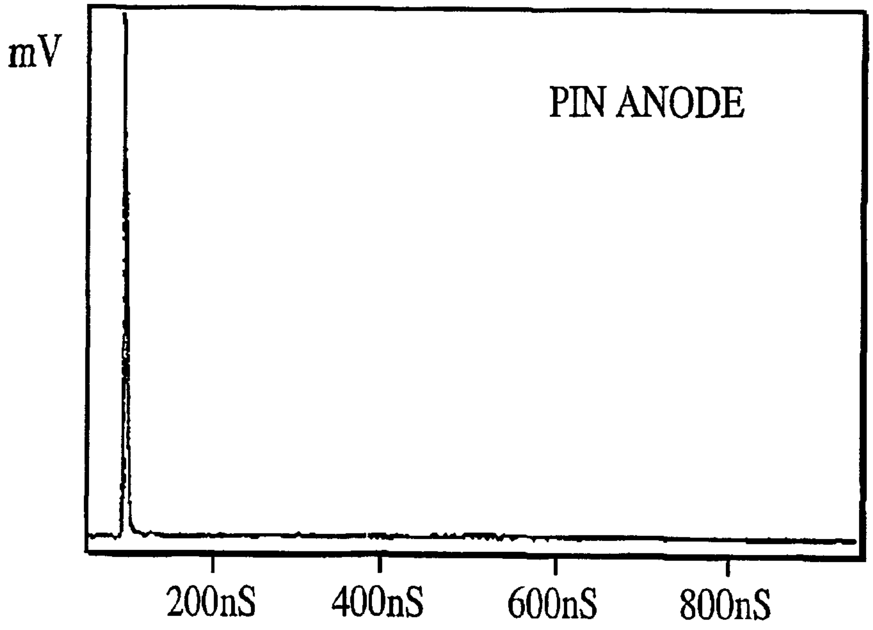

FIG. 4 compares the single ion detector response for both the conventional disk anode and the pin anode configurations. It is evident from FIG. 4 that ringing is significantly reduced and the ion pulse width is reduced to a value of 500 ps/pulse, limited by the analog bandwidth of the oscilloscope used for the measurement (1.5 GHz: 8 Gsamples/sec), when using the pin anode configuration of the present invention. Furthermore, the background signal in the time-of-flight data caused by spurious noise is found to be much quieter when the pin anode configuration is used.

II. Results

Figure 5:
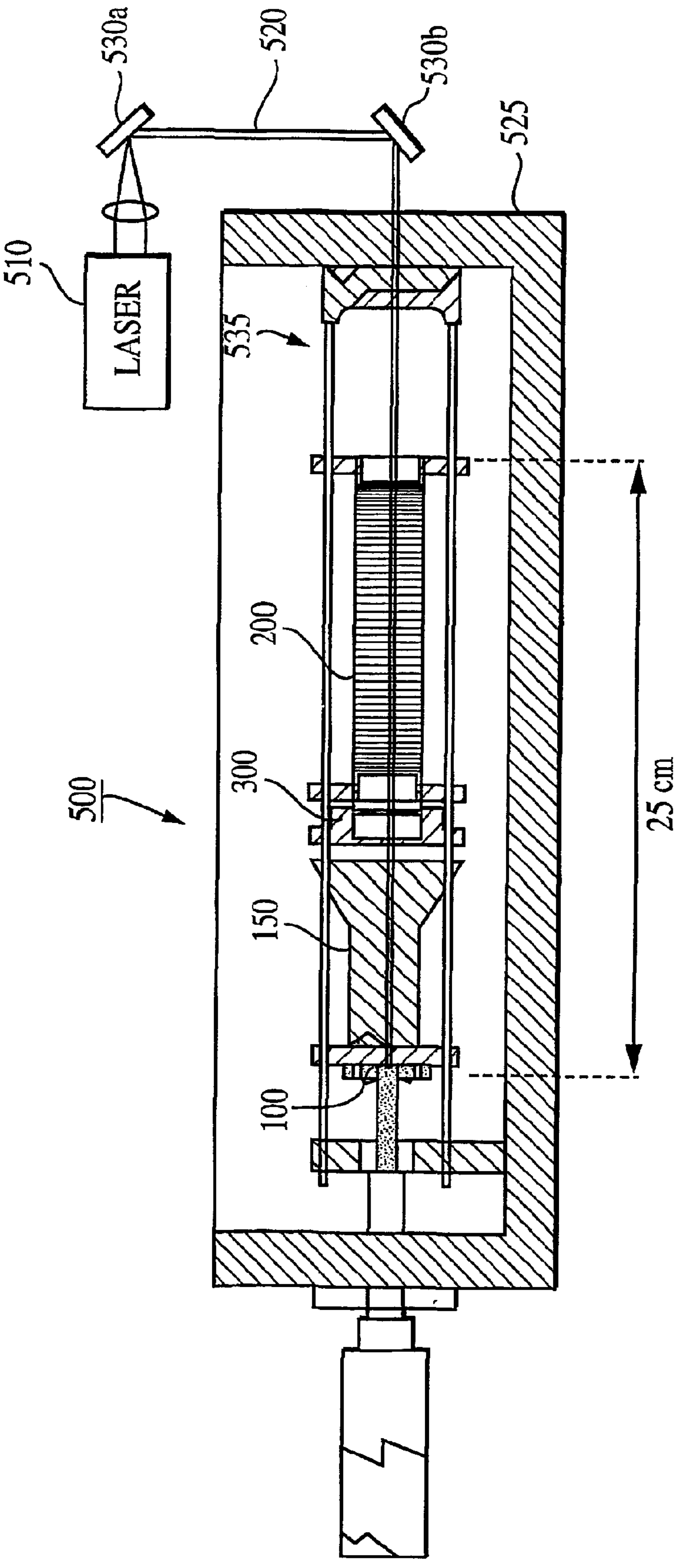
FIG. 5 is a cut-away view of the TOF-MS having the gridless, focusing ionization extraction device, the flexible circuit-board reflector and the center-hole microchannel plate detector assembly according to the present invention.

FIG. 5 depicts a TOF-MS designated generally by reference numeral 500 which has the inventive components, i.e., the focusing ionization extraction device 100, the flexible circuit-board reflector 200, and the microchannel plate detector assembly 300. The overall length of the entire TOF-MS is approximately 25 cm. A laser 510, such as a nitrogen laser, is used for acquiring MALDI and laser ablation spectra. The laser 510 emits a laser beam 520 which is directed through the TOF-MS 500 using two mirrors 530*a*, 530*b*. The TOF-MS 500 is enclosed within a vacuum chamber 525 and mounted into position by a bracket/rod assembly 535 such that the laser beam 520 passes through a central path defined by the inventive components. In an experimental study, time-of-flight data was acquired on a LeCroy 9384 Digital Oscilloscope (1 GHz: 2 Gsam/s) used in conjunction with spectrum acquisition software.

Figure 6A:
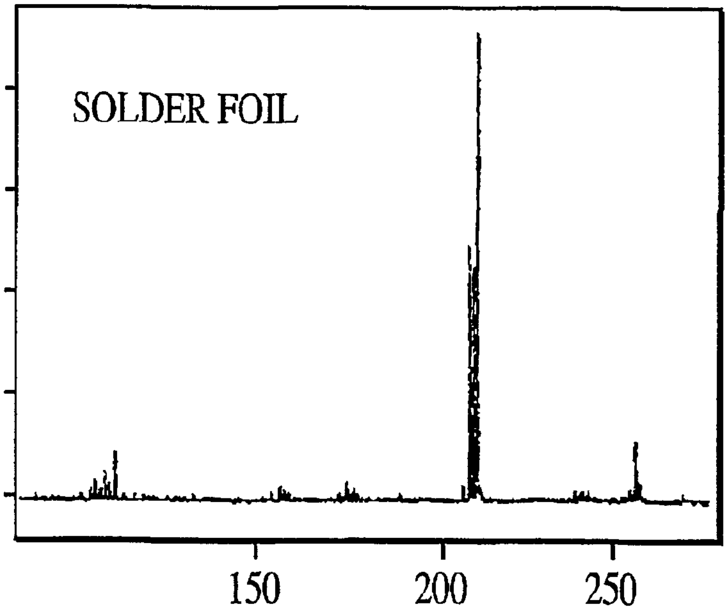
FIGS. 6A and 6B are spectra from solder foil and angiotensin II collected using the TOF-MS having the inventive components.

Several different types of samples were used to test the performance of the TOF-MS 500. Surface roughness was an important consideration because heavily pitted surfaces or organic samples with enlarged crystal formation can significantly increase the distribution of ion kinetic energies in the very high field extraction region. Samples were therefore prepared to ensure a smooth desorption surface. FIG. 6A displays the direct laser desorption signal obtained from a clean lead solder foil surface in which spectra from twenty consecutive laser shots were acquired and averaged. Isotopic distributions from both the major lead and minor tin components are clearly resolved. Peak widths at half-maximum are approximately equal to the 5 ns laser pulse width (resolution $m/\Delta m \approx 1000$).

Figure 6B:
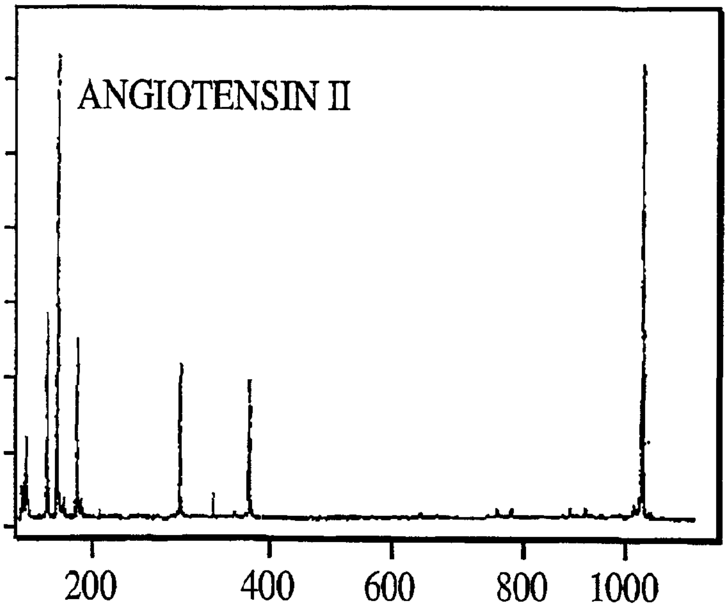

FIG. 6B shows the averaged MALDI spectrum (25 laser shots) of angiotensin II using α-cyano-4-hydroxycinnamic acid as the matrix. Isotopic separation of the $MH^+$ peak at 1047 Da represents a resolution of greater than 1500.

III. Conclusions

An innovative, compact time-of-flight mass spectrometer 500 has been developed using a gridless, focusing ionization extraction device 100, a flexible circuit-board ion reflector 200, and a center-hole microchannel plate detector assembly 300. Experimental studies using the TOF-MS 500 indicate that the TOF-MS 500 is capable of producing spectra with very good resolution and low background noise; a problematic feature of many conventional coaxial TOF-MS instruments. Results also indicate that background noise for data acquired on the TOF-MS 500 is substantially reduced, resolution is improved, and the potential for mass producing the TOF-MS 500 in an inexpensive and rugged package for field-portable and remote installations is significantly enhanced.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. A time-of-flight mass spectrometer (TOF-MS) comprising:

an ionization extraction device having an unobstructed central chamber for guiding ions there through;

a microchannel plate detector assembly having a channel extending through at least a portion of the assembly; and a flexible circuit-board reflector, wherein said channel is aligned with a central axis of said ionization extraction device and a central axis of said reflector.

2. The spectrometer according to claim 1, wherein the ionization extraction device includes a first region for accelerating ions and a second region for de-accelerating the ions to collimate the ions and to reduce the velocity of the ions.

3. The spectrometer according to claim 2, wherein the first region creates an ion acceleration/extraction field for accelerating the ions.

4. The spectrometer according to claim 3, wherein the ion acceleration/extraction field created measures up to 10 kV/mm.

5. The spectrometer according to claim 2, wherein the ionization extraction device includes a third region for causing the ions to disperse and has an electric field measurement of approximately 0 kV/mm.

6. The spectrometer according to claim 1, wherein the ionization extraction device includes a plurality of micro-cylinders mounted within the chamber for passing the ions there through from the first region to the second region.

7. The spectrometer according to claim 6, wherein the micro-cylinders are metallic.

8. The spectrometer according to claim 2, further comprising at least two regions between the first region and the second region, wherein the at least two regions have a different electric field measurement than the first region and the second region.

9. An ionization extraction device for use in a TOF-MS comprising:

a housing defining an unobstructed central chamber for guiding ions there through;

a first region within the central chamber for accelerating ions using fixed voltages; and a second region within the central chamber in proximity to the first region for de-accelerating the ions entering therein using fixed voltages.

10. The ionization extraction device according to claim 9, wherein the first region creates an ion acceleration/extraction field for accelerating the ions.

11. The ionization extraction device according to claim 10, wherein the ion acceleration/extraction field created measures up to 10 kV/mm.

12. The ionization extraction device according to claim 9, further comprising a third region within the central chamber for causing the ions to disperse and has an electric field measurement of approximately 0 kV/mm.

13. The ionization extraction device according to claim 9, further comprising a plurality of micro-cylinders mounted within the central chamber.

14. The ionization extraction device according to claim 13, wherein the micro-cylinders are metallic.

15. The ionization extraction device according to claim 9, further comprising at least two regions between the first region and the second region, wherein the at least two regions have a different electric field measurement than the first region and the second region.

16. A method for increasing the collection efficiency of laser-desorbed ions in a TOF-MS, said method comprising the steps of:

providing an ionization extraction device within the TOF-MS, the ionization extraction device having an unobstructed central chamber having a first region and a second region;

creating an ion acceleration/extraction field within the first region using fixed voltages;

accelerating ions within the first region;

de-accelerating the ions in the second region using fixed voltages; and drifting the ions in a drift region to cause ion dispersion.

17. The method according to claim 16, wherein the step of creating the ion acceleration/extraction field includes the step of creating a field measuring up to 10 kV/mm.

18. The method according to claim 16, further comprising the step of creating ions in the first region by one of laser ablation and matrix assisted laser desorption/ionization (MALDI).

19. The method according to claim 16, further comprising the step of aligning a central axis of the ionization extraction device with a tubular channel of a microchannel plate detector assembly of the TOF-MS.

20. A method for increasing the collection efficiency of laser-desorbed ions in a TOF-MS, said method comprising the steps of:

providing an ionization extraction device within the TOF-MS, the ionization extraction device having an unobstructed central chamber having a first region and a second region;

aligning a central axis of the ionization extraction device with a central axis of a circuit-board reflector of the TOF-MS;

creating an ion acceleration/extraction field within the first region;

accelerating ions within the first region;

de-accelerating the ions in the second region; and drifting the ions in a drift region to cause ion dispersion.

* * * * *